Dec. 24, 1935.  C. J. WERNER ET AL  2,025,187

LUBRICATING SYSTEM

Filed July 14, 1934  2 Sheets-Sheet 1

INVENTORS
CALVIN J. WERNER - RUSSELL A. GRAVITT
AND ARTHUR H. MARTS
BY
Spencer, Hardman and Fehr
ATTORNEYS

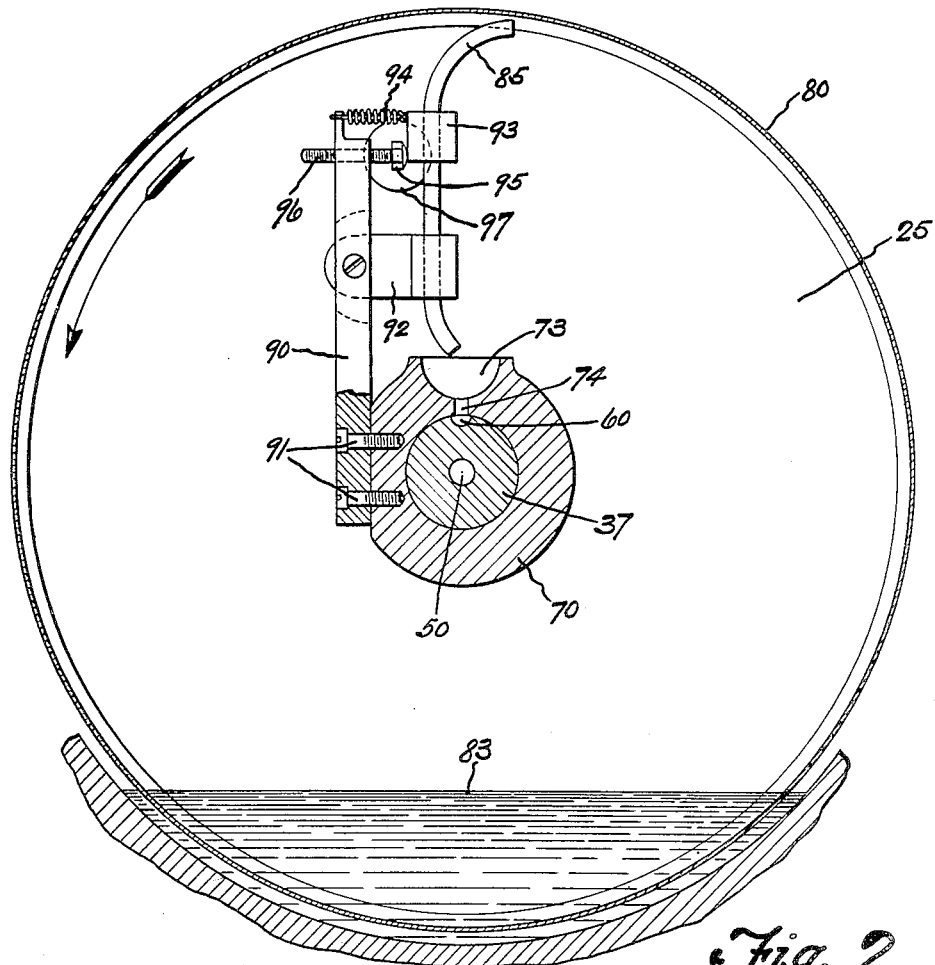
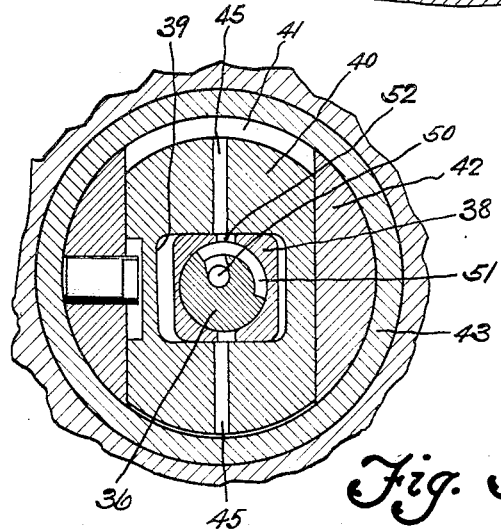

Patented Dec. 24, 1935

2,025,187

UNITED STATES PATENT OFFICE 2,025,187

LUBRICATING SYSTEM

Calvin J. Werner, Russell A. Gravitt, and Arthur H. Marts, Dayton, Ohio, assignors to General Motors Corporation, Detroit, Mich., a corporation of Delaware Application July 14, 1934, Serial No. 735,108

7 Claims. (Cl. 184—6)

This invention relates to improvements in lubricating systems particularly adapted for use in connection with compressors and the like.

It is among the objects of the present invention to provide a lubricating device of simple structure and design, and having a minimum number of moving parts.

A further object of the present invention is to provide a lubricating device having a single moving element adapted to lift lubricant from a source of supply, another element of the device being adapted to pick up a portion of this lubricant and deliver it to the parts to be lubricated.

A still further object is to provide a simple lubricating device which is adapted to be adjusted to vary the amount of lubricant delivered to the moving parts.

Further objects and advantages will be apparent from the following description reference being had to the accompanying drawings wherein a preferred embodiment of the present invention is clearly shown.

In the drawings:

Figure 2 is a fragmentary sectional view taken substantially along the lines 2—2 of Figure 1; and Figure 3 is a fragmentary sectional view taken substantially along the line 3—3 of Figure 1.

Figure 1:
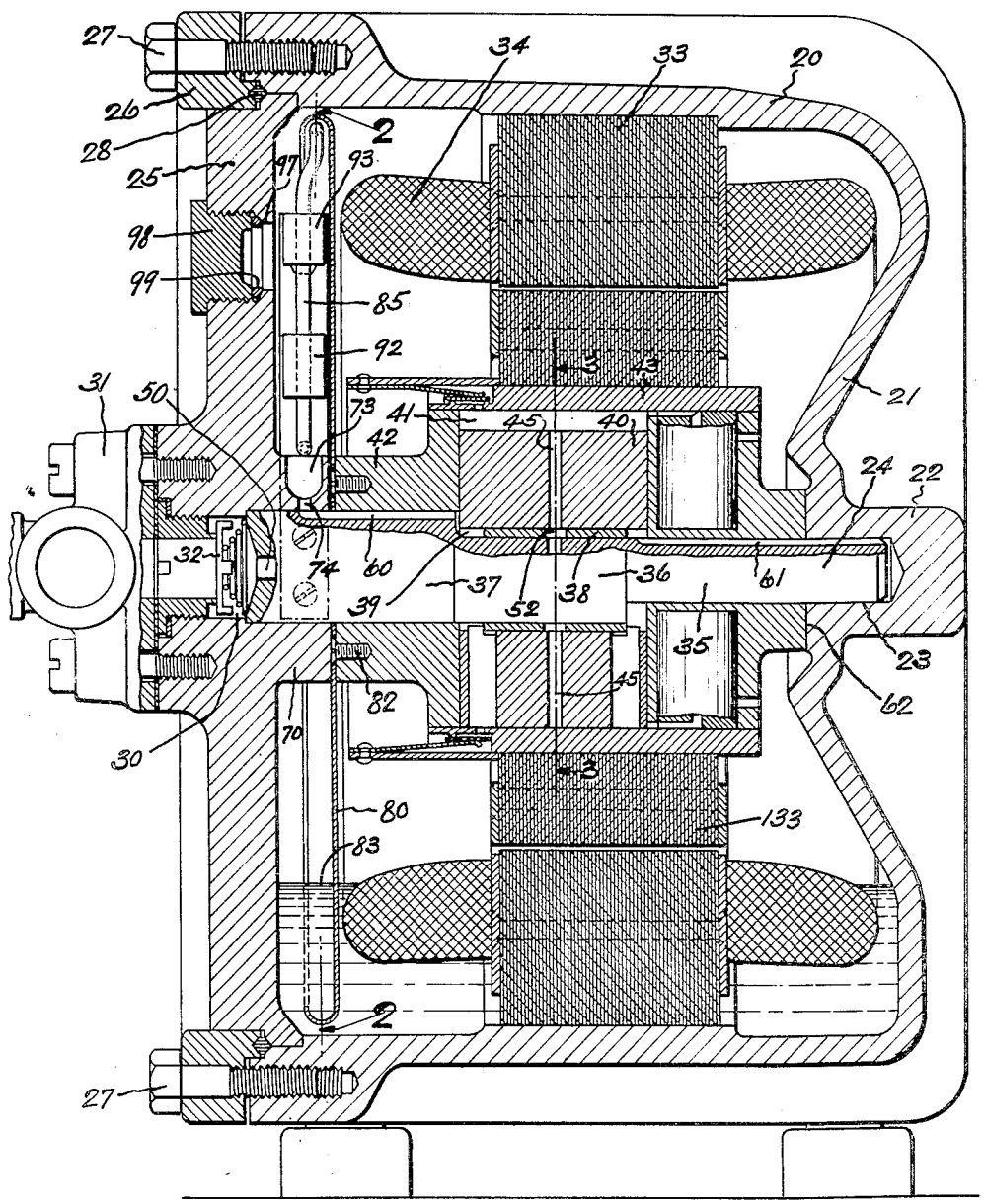
Figure 1 is a sectional view of a compressor equipped with the present invention.

Referring to the drawings, the improved lubricating device is shown applied to an electrically driven compressor which comprises a bowl-shaped housing 20 having one end closed by the wall 21, the other end being open. This open end of the housing 20 is adapted to be closed and sealed by the end cover member 25 which is clamped in position on the housing 20 by a clamping ring 26 secured to the housing by bolts 27. A suitable gasket 28 is provided between the clamping ring 26, the housing 20 and the end cover 25 to prevent gas or fluid leaks.

Coaxially of the housing 20, end wall 21 is provided with a lug 22 recessed as at 23 to form a bearing which is in coaxial alignment with a passage 30 provided in the end cover member 25. A stationary shaft is supported between the end wall 21 of the housing and the end cover member 25, this shaft being designated by the numeral 24; one end being supported in the recess 23 of the housing, the other end extending into and being supported within passage 30 in the end cover member 25. This shaft is divided into three areas or sections designated by the numerals 35, 36 and 37. The two end portions 35 and 37, supported in the recess 23 and passage 30 respectively, are concentric, while the intermediate portion 36 is eccentric of these two previously mentioned portions of the shaft.

A connector block 31 is secured to the cover plate 25, this connector block having passages communicating with the passage 30 whereby gas or fluid may be introduced through the block into said passage. A valve 32 within the passage 30, between the connector block 31 and the end of shaft 24 is adapted to be actuated to permit fluid to flow into the passage 30 from the connector block 31, but prevents the reverse flow of fluid from the passage 30 out of the compressor through the connector block 31.

The electric machine for operating the rotor of the compressor comprises a stator 33 carried within the housing 20 and having field windings 34. The rotor of the electric machine comprises a block 42 rotatably supported upon the shaft portions 35 and 37. This block 42 has a transverse cylindrical bore 41 which forms the cylinder of the compressor. In order to provide cylinder heads for this cylinder a ring member 43 is press-fitted about the block 42. Upon this ring member are mounted the laminations 133 which rotate with the block 42.

A piston 40 is reciprocatively carried within the cylinder 41, said piston 40 having a rectangular opening, as shown in Figure 3, in which the cross head 38 is slidably carried. This cross head 38 fits about the eccentric shaft portion 36 and in response to rotation of the rotor 42 cross head 38 will cause piston reciprocation due to the eccentricity between shaft portion 36 which carries the cross head and the block 42 which provides the cylinder in which the piston reciprocates and which is rotatably carried by the concentric shaft portions 35 and 37. Gas or fluid passages 50 are provided in the shaft which passages form communication between the chamber adjacent valve 32 and a groove 51 in the peripheral surface of the shaft portion 36 which groove 51 communicates with passages 52 in the cross head, said passages 52 communicating with longitudinal passages 45 in the piston at proper intervals during the operation of the device so that fluid flowing from passage 50 to piston passages 45 is properly timed and controlled.

The lubricating device for the compressor comprises a vane or disc 80 secured to the block 42 by screws 82 so that it will rotate with said block. This vane has a peculiarly shaped peripheral edge which dips into the lubricant supply 83, shown in the bottom of the compressor casing, the peculiar construction of the disc edge causing said disc to lift the lubricant and carry it as it is rotated by the block 42.

In Figure 2 the means for picking up a portion of the lubricant carried by the disc 80 is clearly illustrated. In this figure the lug 70 on the inner surface of the end cover member 25 is shown having a standard 90 attached thereto by screws 91. A member 92 is hingedly carried by standard 90; this member 92 vertically supporting a pipe 85, the upper end of which is curved or shaped so that its open end lies within the supply of lubricant carried by the disc. The other end of pipe 85 discharges into the receiver chamber 73 formed in the lug 70, which receiving chamber is in communication with oil channel 60 in the shaft portion 37 through the passage 74 also in lug 70. The oil channel 60 in the shaft portion 37 leading from passage 74, communicates with the rectangular opening 39 in the piston for purposes of lubricating the cross head, portions of this lubricant supply leaking past the contacting surfaces to provide proper lubrication for the piston in cylinder 41. Another oil channel 61 in shaft portion 35 is supplied by the lubricant in the rectangular chamber 39 to lubricate the portion of block 42 which is rotatably supported on shaft portion 35. Excessive fluid delivered to the oil channel 61 may escape between the surface of the block 42 and the end cover 21 indicated by the numeral 62. This excess fluid will drip back into the lubricant supply 63.

The pipe 85, being carried by the pivoted member 92, is thus rendered adjustable. As the pipe is moved clockwise with regard to Figure 2, the upper end thereof is moved further out of the oil supply carried by the disc 80; and thus, a less supply of lubricant will be delivered to the receiving chamber 73; while on the other hand, if a greater supply of fluid to the receiving chamber 73 is desired, then the pipe 85 is moved counterclockwise so as to bring its upper end into closer proximity with the edge of the disc 80, whereby a greater supply of oil will be picked up by said pipe. To make these adjustments a screw 96 is threadedly received by the standard 90 the head 95 of said screw engaging an abutment block 93 carried by the pipe, which abutment block has one end of a spring 94 secured thereto; the other end of said spring being attached to the standard 90. It may be seen that spring 94 normally urges the pipe and its carrier 92 in a counterclockwise direction; this movement being limited by the position of the adjustment screw 96.

To render this adjustment screw 96 accessible from outside the compressor, so that adjustments may be made without disassembling the compressor, an opening 97 is provided in the cover plate 25, this opening being interiorly threaded to receive the screw plug 98. A gasket 99 is provided on the screw plug 98 to prevent fluid leaks. This also facilitates disassembling, for if removal of the end cover plate 25 were attempted without moving the pipe 85 out of the confines of the semicircular peripheral edge of the disc 80, bending of the pipe 85 would result, for this pipe would engage the peripheral edge. However, when it is desired to disassemble the device, plug 98 is removed and an instrument is used to rotate pipe 85 and its carrier 92 clockwise until the upper end of the pipe 85 is moved out of the confines of the semicircular peripheral edge of the disc 80, whereby withdrawal of the moving parts of the compressor is permitted without danger of damaging or bending the pipe 85.

From the aforegoing, it may be seen that applicants have provided a lubricating device for a compressor, said device having only one moving part which is adapted to pick up and deliver the fluid to an adjustable pipe which conducts the proper supply of lubricant to the parts to be lubricated. A simple arrangement permits adjustment whereby the amount of lubricant delivered to the movable parts may be varied to meet conditions.

While the embodiment of the present invention as herein disclosed, constitutes a preferred form, it is to be understood that other forms might be adopted, all coming within the scope of the claims which follow.

What is claimed is as follows:

1. In a device of the character described, the combination with a casing; a lubricant supply in said casing; a non-rotatable member having a receiving chamber and lubricating ducts leading therefrom; a rotor carried by said member; a disc attached to the rotor; means at the peripheral edge of the disc adapted to dip into the lubricant supply and pick up and carry a portion of said lubricant; a pipe for taking up a part of the lubricant carried by said means and delivering it to the receiving chamber; and means pivotally supporting the pipe on the non-rotatable member for permitting the pipe to be moved from juxtaposition with the disc for disassembling purposes.

2. In a device of the character described, the combination with a casing; a lubricant supply in said casing; a non-rotatable member having a receiving chamber and lubricating ducts leading therefrom; a rotor carried by said member; a disc attached to the rotor; means at the peripheral edge of the disc adapted to dip into the lubricant supply and pick up and carry a portion of said lubricant; a pipe pivotally carried by the non-rotatable member and adapted to take up lubricant from the means on the periphery of the disc and deliver it to the receiving chamber; means for adjusting said pipe to vary its proximity to the edge of the disc; and means removable from the casing to render the adjusting means and pipe accessible from outside the casing.

3. In a device of the character described, the combination with a casing; a lubricant supply in said casing; a non-rotatable member having a receiving chamber and lubricating ducts leading therefrom; a rotor carried by said member; a standard attached to the non-rotatable member; a disc secured to the rotor; means on the periphery of the disc for dipping into the lubricant and picking up and carrying with it a portion of said lubricant supply; a pipe pivotally supported by the standard so that one end of the pipe lies in juxtaposition with the lubricant carrying means on the disc for taking up a portion of said lubricant, the other end of the pipe discharging the lubricant into the receiving chamber; a screw on the standard engaging the pipe and adapted to adjust it relatively to the disc; a spring urging the pipe against the screw; and removable means on the casing for rendering the screw and pipe accessible from outside the casing.

4. In a device of the character described, the combination with a casing comprising a main body portion and a removable cover therefor; a shaft non-rotatably supported between said body and cover, said shaft having oil channels; a supply of lubricant in said casing; a lubricant receiving chamber in the cover, communicating with the oil channels; a member rotatably supported upon the shaft; means attached to said member adapted to dip into the lubricant for picking up a portion of said lubricant and carrying it with it as said member rotates; and a conduit adapted to take up some of the lubricant carried by the aforementioned means and deliver it to the receiving chamber, said conduit being pivotally carried by the cover to permit adjustments thereof and facilitate assembling.

5. In a device of the character described, the combination with a casing; a lubricant supply in the casing; a member having a receiving opening and lubricant passage leading therefrom; rotary means rotatably mounted within the casing; a disc rotatably mounted and driven by the rotary means, dipping into the lubricant supply and adapted to pick up and carry with it a portion of said lubricant; means, one portion of which extends into close proximity to the disc for taking up some of the lubricant carried by the disc, and another portion of which discharges lubricant into the receiving opening; and means for adjusting the position of the last mentioned means to effect control of the flow of lubricant from the disc to the receiving opening.

6. In a device of the character described, the combination with a casing; a lubricant supply in the casing; a member having a receiving opening and lubricant passage leading therefrom; rotary means rotatably mounted within the casing; a member rotatably mounted and driven by the rotary means, dipping into the lubricant supply and adapted to pick up and carry with it a portion of said lubricant; means, one portion of which extends in close proximity to the rotatably mounted member for taking up some of the lubricant carried by the rotatably mounted member, and another portion of which discharges lubricant into the receiving opening; and means accessible from outside the casing for effecting adjustment of flow of lubricant from the rotatably mounted member to the receiving opening.

7. In a device of the character described, the combination with a casing having a supply of lubricant therein and rotary means rotatably mounted within the casing, of means for supplying a flow of lubricant to the rotary means; said means for supplying a flow of lubricant comprehending a rotatably mounted member driven by the rotary means, dipping into the lubricant supply and adapted to carry with it a portion of the lubricant, lubricant conducting means having a portion in close proximity to the rotatably mounted member for taking up some of the lubricant carried by the rotatably mounted member; and means for adjusting the lubricant conducting means to effect control of the flow of lubricant to the rotary means.

CALVIN J. WERNER.
RUSSELL A. GRAVITT.
ARTHUR H. MARTS.